United States Patent
Ma et al.

(10) Patent No.: US 12,510,358 B2
(45) Date of Patent: Dec. 30, 2025

(54) MICRO-MECHANICAL GYROSCOPE AND ELECTRONIC PRODUCT

(71) Applicant: AAC Kaitai Technologies (Wuhan) CO., LTD., Hubei (CN)

(72) Inventors: Zhao Ma, Wuhan (CN); Xiao Kan, Wuhan (CN); Shitao Yan, Wuhan (CN); Shan Yang, Wuhan (CN); Zhan Zhan, Wuhan (CN); Yang Li, Wuhan (CN); Veronica Tan, Singapore (SG); Kahkeen Lai, Singapore (SG)

(73) Assignee: AAC Kaital Technologies (Wuhan) CO., LTD., Wuhan (CN)

( * ) Notice: Subject to any disclaimer, the term of this patent is extended or adjusted under 35 U.S.C. 154(b) by 338 days.

(21) Appl. No.: 18/313,350

(22) Filed: May 7, 2023

(65) Prior Publication Data

US 2024/0271934 A1      Aug. 15, 2024

Related U.S. Application Data

(63) Continuation of application No. PCT/CN2023/086867, filed on Apr. 7, 2023.

(30) Foreign Application Priority Data

Feb. 14, 2023   (CN) .......................... 202310127029.5

(51) Int. Cl.
   *G01C 19/5747* (2012.01)
   *G01C 19/5769* (2012.01)
(52) U.S. Cl.
   CPC ..... *G01C 19/5747* (2013.01); *G01C 19/5769* (2013.01)

(58) Field of Classification Search
   None
   See application file for complete search history.

(56) References Cited

U.S. PATENT DOCUMENTS

| | | | |
|---|---|---|---|
| 2010/0116050 A1* | 5/2010 | Wolfram | G01C 19/574 73/504.12 |
| 2011/0154898 A1* | 6/2011 | Cazzaniga | G01C 19/5747 73/504.12 |
| 2016/0370180 A1* | 12/2016 | Naumann | G01C 19/5621 |
| 2017/0261322 A1* | 9/2017 | Gattere | G01C 19/5712 |
| 2020/0309806 A1* | 10/2020 | Pruetz | G01P 3/44 |
| 2022/0065630 A1* | 3/2022 | Joet | G01C 19/5663 |

* cited by examiner

*Primary Examiner* — Mark A Shabman
(74) *Attorney, Agent, or Firm* — Wiersch Law Group

(57) ABSTRACT

The present disclosure provides a micro-mechanical gyroscope and an electronic product. The micro-mechanical gyroscope includes first mass blocks, second mass blocks, a first driving member, a second driving member, first coupling components and second coupling components. The second mass blocks, the first driving member and the second driving member are arranged between the first mass blocks. The second mass blocks are arranged on either sides of the first second driving members. A first mass block arranged on a side of the first driving member is connected to the first driving member through a first coupling component, and a first mass block arranged on a side of the second driving member is connected to the second driving member through a first coupling component. Ends of the second mass block in the first direction are connected to the first driving member and the second driving member, respectively, through the second coupling components.

9 Claims, 7 Drawing Sheets

MICRO-MECHANICAL GYROSCOPE AND ELECTRONIC PRODUCT

CROSS REFERENCE TO RELATED APPLICATIONS

The present application is a continuation of PCT Patent Application No. PCT/CN2023/086867, filed Apr. 7, 2023, which claims priority to Chinese patent application No. 202310127029.5, filed Feb. 14, 2023, each of which is incorporated by reference herein in its entirety.

TECHNICAL FIELD

The present disclosure relates to the field of gyroscope technology, and in particular to a micro-mechanical gyroscope and an electronic product.

BACKGROUND

Micro-mechanical gyroscope is a micro angular velocity sensor made using micro-mechanical processing technology and microelectronics technology. In the driving mode, the micro-mechanical gyroscope oscillates around the axis of a vertical mass block. When being applied an angular velocity, due to the Coriolis effect, the gyroscope transfers energy to the detection mode, causing the vibrating disk to swing out of the plane under relative drive. The angular velocity can be acquired by detecting the displacement of the out-of-plane oscillation.

In the Micro-mechanical gyroscopes according to the related technologies, the detection mode and the driving mode share a mass block, resulting in superposition of detection errors due to the coupling of the two modes.

Therefore, it is necessary to provide a new micro-mechanical gyroscope to address the above problem.

SUMMARY

The present disclosure aims to provide a micro-mechanical gyroscope and an electronic product, which can reduce the degree of mutual interference of the mass blocks in different modes. In this way, detection accuracy can be improved.

The technical solution of the present disclosure is as follows.

Some embodiments of the present disclosure provide a micro-mechanical gyroscope, including:
  a plurality of first mass blocks and a plurality of second mass blocks;
  a first driving member and a second driving member; and
  first coupling components and second coupling components being flexible components.

The plurality of first mass blocks are arranged to face to each other in a first direction, and the plurality of second mass blocks, the first driving member and the second driving member are arranged between the plurality of first mass blocks. The first driving member and the second driving member are arranged to face to each other in the first direction, and in a second direction perpendicular to the first direction, the plurality of second mass blocks are arranged on either sides of the first driving member and the second driving member.

A first mass block arranged on a side of the first driving member away from the second driving member is connected to the first driving member through a first coupling component, and a first mass block arranged on a side of the second driving member away from the first driving member is connected to the second driving member through a first coupling component. Ends of the plurality of second mass block in the first direction are connected to the first driving member and the second driving member, respectively, through the second coupling components.

In some embodiments, the plurality of first mass blocks are symmetrically arranged along the first direction, the plurality of second mass blocks are symmetrically arranged along the second direction, and the first driving member and the second driving member are symmetrically arranged along the first direction.

In some embodiments, a first coupling component includes first connecting beams, the first driving member is connected to a first mass block through a first connecting beam, and the second driving member is connected to a first mass block through a first connecting beam.

A second coupling component includes second connecting beams and two first coupling parts. Each end of each first coupling part of the two first coupling parts is connected with a respective second connecting beam, one first coupling part of the two first coupling parts is connected to the first driving member and one end of a second mass block, respectively, through the second connecting beams located at both ends, and the other first coupling part is connected to the second driving member and the other end of the second mass block, respectively, through the second connecting beams located at both ends.

In some embodiments, the micro-mechanical gyroscope further includes a base, and third coupling components and fourth coupling components being flexible components. The base has a square area, first anchor points and second anchor points. A respective first anchor point is arranged at each corner of the square area, and the first driving member and the second driving member are arranged on either sides of the square area. The plurality of second mass blocks are arranged on either sides of the square area, and the second anchor points are arranged on a side of a second mass block away from the square area.

A second coupling component is connected to a first anchor point through a third coupling component, and each first mass block of the plurality of first mass blocks arranged to face to each other in the first direction is connected to a second anchor point through a respective fourth coupling component.

In some embodiments, a third coupling component includes a third connecting beam, and a second coupling component is connected to a respective first anchor point through the third connecting beam.

A fourth coupling component includes fourth connecting beams and a second coupling part connected to a respective second anchor point, and each end of the second coupling part is connected to a respective first mass block through a fourth connecting beam.

In some embodiments, the micro-mechanical gyroscope further includes a fifth coupling component being a flexible component. The base further has a third anchor point located between the first driving member and the second driving member. The plurality of second mass blocks are connected through the fifth coupling component, and the fifth coupling component is connected to the third anchor point.

In some embodiments, the fifth coupling component includes a third coupling part and fifth connecting beams. The third coupling part is connected to the third anchor point, and each end of the third coupling part is connected to a respective second mass block through a respective fifth connecting beam.

In some embodiments, the micro-mechanical gyroscope further includes in-plane driving transducers, out-of-plane detection transducers, and in-plane detection transducers. Each of the first driving member and the second driving member has an accommodation space, and each in-plane driving transducer of the in-plane driving transducers is arranged in a respective accommodation space. An out-of-plane detection transducer and in-plane detection transducers spaced from each other are arranged on a first mass block, and a respective out-of-plane detection transducer is arranged on each second mass block of the plurality of second mass blocks.

In some embodiments, out-of-plane detection transducers arranged on the plurality of first mass blocks are symmetrically arranged along the first direction, the in-plane detection transducers arranged on the plurality of first mass blocks are symmetrically arranged along the first direction, and out-of-plane detection transducers arranged on the plurality of second mass blocks are symmetrically arranged along the second direction.

Some embodiments of the present disclosure provide an electronic product, including:
a main body; and
the micro-mechanical gyroscope as illustrated above, and the micro-mechanical gyroscope is installed in the main body.

The present disclosure has the following beneficial effects.

In the micro-mechanical gyroscope and the electronic product provided by the present disclosure, the plurality of first mass blocks are arranged to face to each other in a first direction, and the plurality of second mass blocks, the first driving member and the second driving member are arranged between the plurality of first mass blocks. The first driving member and the second driving member are arranged to face to each other in the first direction, and in a second direction, the plurality of second mass blocks are arranged on either sides of the first driving member and the second driving member. The first and second driving members are connected to a first mass block, respectively, through a flexible component. Ends of the plurality of second mass block are connected to the first driving member and the second driving member, respectively, through flexible components. When detecting angular velocity by the micro-mechanical gyroscope, the coupling between the driving mode and the detection modes of the plurality of first mass blocks and the plurality of second mass blocks can be reduced, thereby reducing the displacement of non-moving mass blocks. In this way, the degree of mutual interference of the plurality of first mass blocks and the plurality of second mass blocks in different modes can be reduced, and detection accuracy can be improved.

REFERENCE NUMERALS

1—first mass blocks;
2—second mass blocks; 21—the first end; 22—the second end;
3—first driving member;
4—second driving member;
5—first coupling components;
6—second coupling components; 61—second connecting beams; 62—first coupling parts;
7—base; 71—square area; 72—first anchor points; 73—second anchor points; 74—third anchor point;
8—third coupling components;
9—fourth coupling components; 91—fourth connecting beam; 92—second coupling part;
10—fifth coupling component; 101—third coupling part; 102—fifth connecting beams;
11—in-plane driving transducers;
12—out-of-plane detection transducers;
13—in-plane detection transducers.

DETAILED DESCRIPTION OF EMBODIMENTS

The present disclosure will be further illustrated in conjunction with the accompanying drawings and embodiments.

Figure 1:
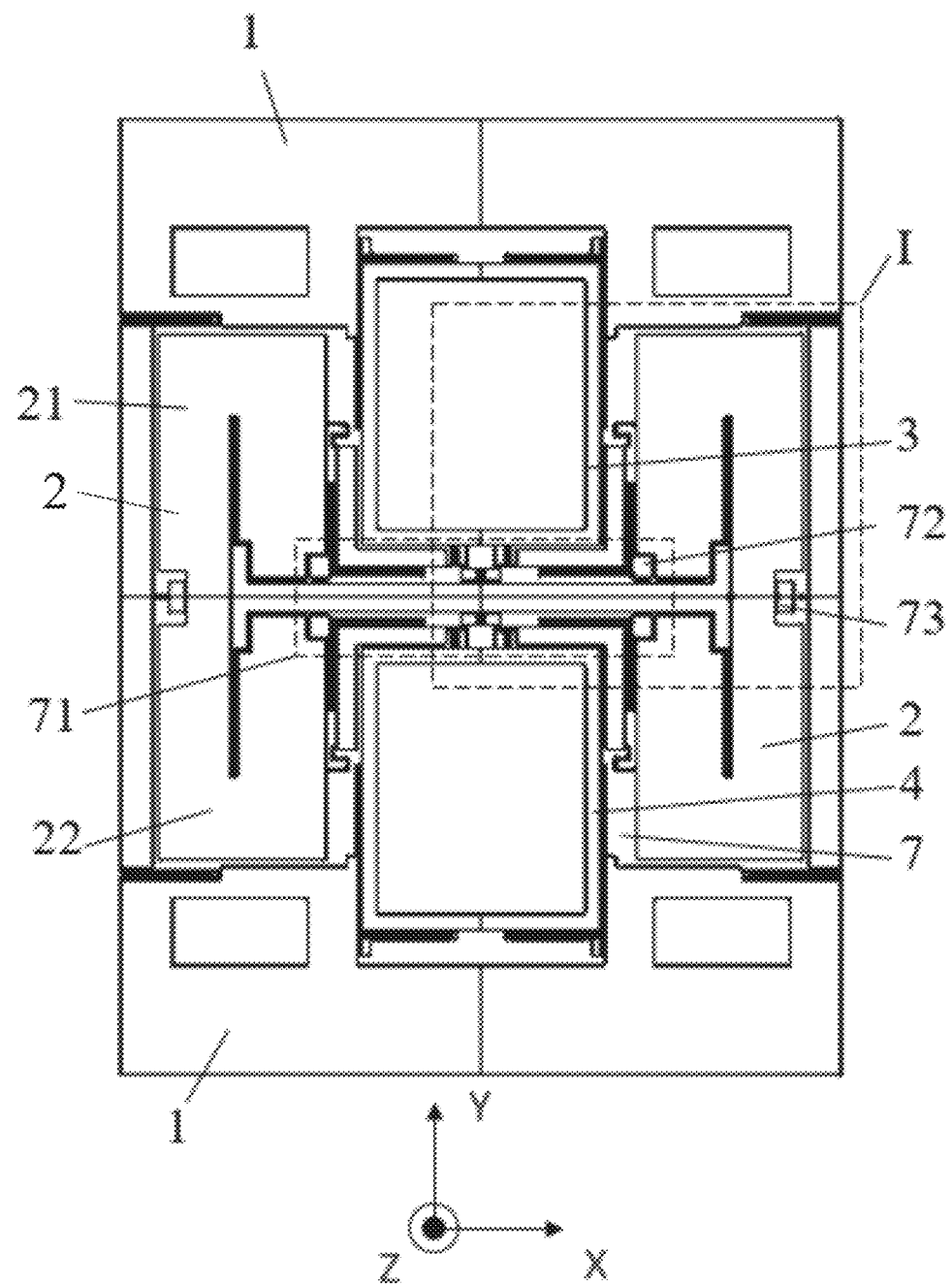
FIG. 1 is a front view of the micro-mechanical gyroscope according to some embodiments of the present disclosure.
Figure 2:
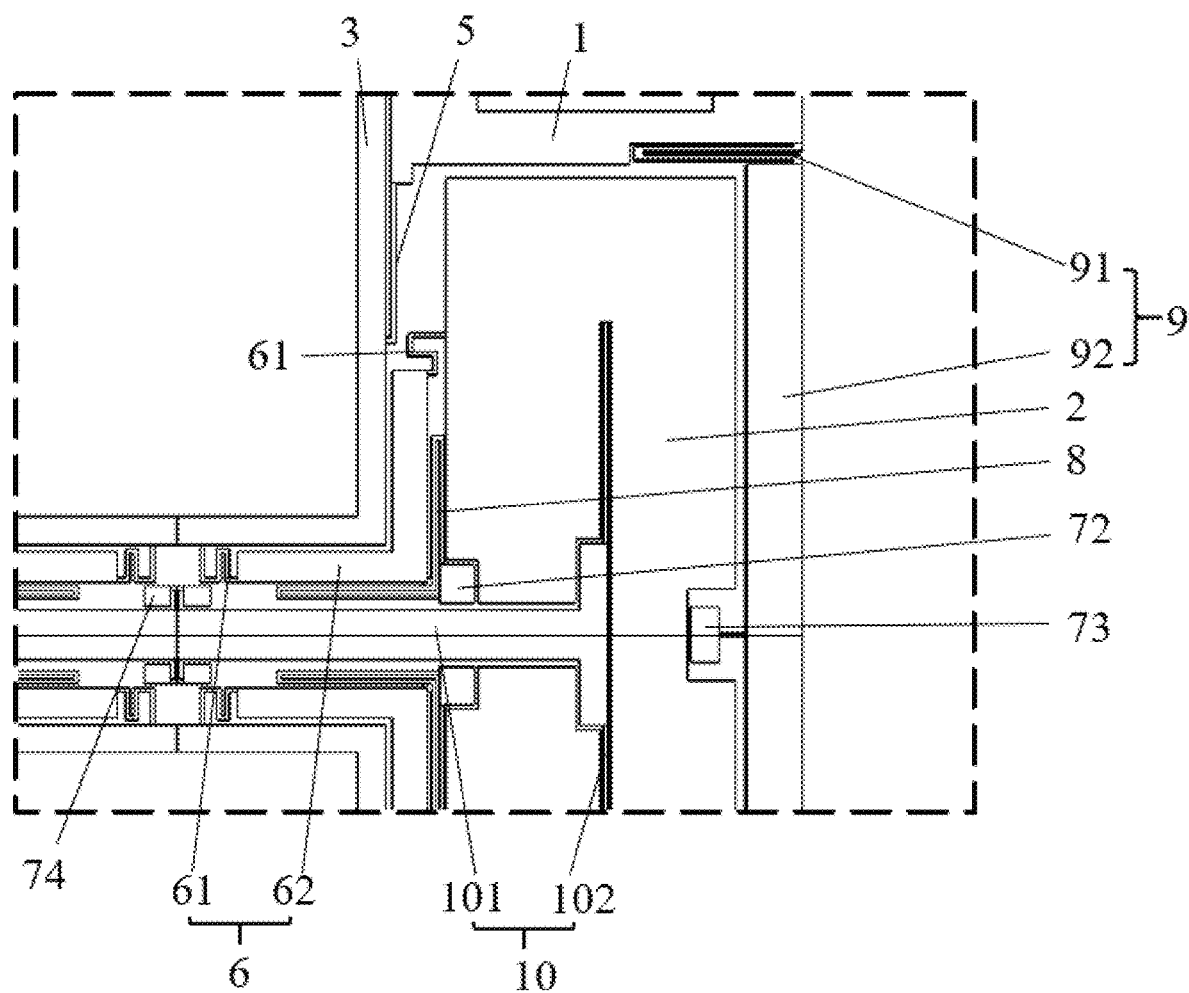
FIG. 2 is an enlarged view of location I in FIG. 1.

The present disclosure provides a micro-mechanical gyroscope, as shown in FIGS. 1 and 2, the micro-mechanical gyroscope includes a plurality of first mass blocks 1, a plurality of second mass blocks 2, a first driving member 3, a second driving member 4, first coupling components 5 and second coupling components 6. The plurality of first mass blocks 1 are arranged to face to each other in a first direction Y, and the plurality of second mass blocks 2, the first driving member 3 and the second driving member 4 are arranged between the plurality of first mass block 1. The first driving member 3 and the second driving member 4 are arranged to face to each other in the first direction Y, and in a second direction X perpendicular to the first direction Y, the plurality of second mass blocks 2 are arranged on either sides of the first driving member 3 and the second driving member 4. The first coupling components 5 and the second coupling components 6 are all flexible components. A first mass block 1 arranged on a side of the first driving member 3 away from the second driving member 4 is connected to the first driving member 3 through a first coupling component 5, and a first mass block 1 arranged on a side of the second driving member 4 away from the first driving member 3 is connected to the second driving member 4 through a first coupling component 5. Ends of the plurality of second mass block 2 in the first direction Y are connected to the first driving member 3 and the second driving member 4, respectively, through the second coupling components 6.

The micro-mechanical gyroscope has four working modes, i.e. a driving mode, a first detection mode, a second detection mode and a third detection mode. As shown in FIG. 1, there are two first mass blocks 1, two second mass blocks 2, one first driving member 3 and one second driving member 4. The first driving member 3 is located at above in FIG. 1, and the second driving member 4 is located at below in FIG. 1. The first mass block 1 located above the first driving member 3 is connected to the first driving member 3 through the first coupling component 5, the first mass block 1 located below the second driving member 4 is connected to the second driving member 4 through the first coupling component 5, the upper end of the second mass block 2 is connected to the first driving member 3 through the second coupling component 6, and the lower end of the second mass block 2 is connected to the second driving member 4 through the second coupling component 6, The first direction Y is defined as the direction of the Y axis, the second direction X is defined as the direction of the X axis, the Z axis is perpendicular to both the X and Y axes, and the plane where the X and Y axes are located is defined as the reference plane.

Figure 5:
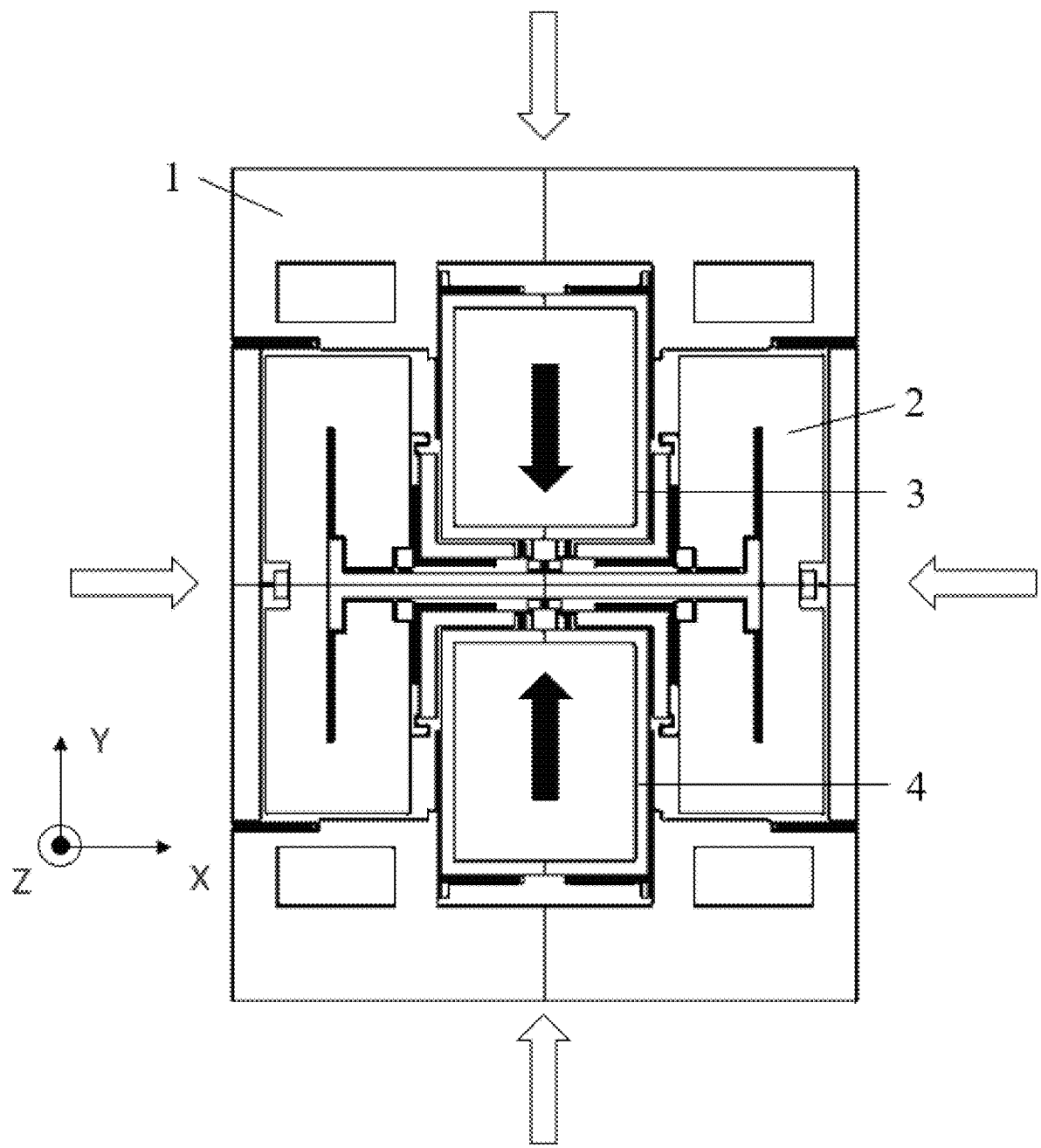
FIG. 5 is a structure diagram of the micro-mechanical gyroscope in the driving mode according to some embodiments of the present disclosure.

Exemplarily, when detecting angular velocity, the micro-mechanical gyroscope is put in the driving mode first. In the driving mode, the first driving member 3 moves in the first direction Y, and the second driving member 4 moves in the opposite direction to the first direction Y (as shown by the black arrows in FIG. 5). In this case, the first driving member 3 and the second driving member 4 drive the two first mass blocks 1 to move in opposite directions along the Y axis, respectively, Drive two second mass blocks 2 to move in opposite directions along the X-axis (as shown by the white arrows in FIG. 5).

Figure 6:
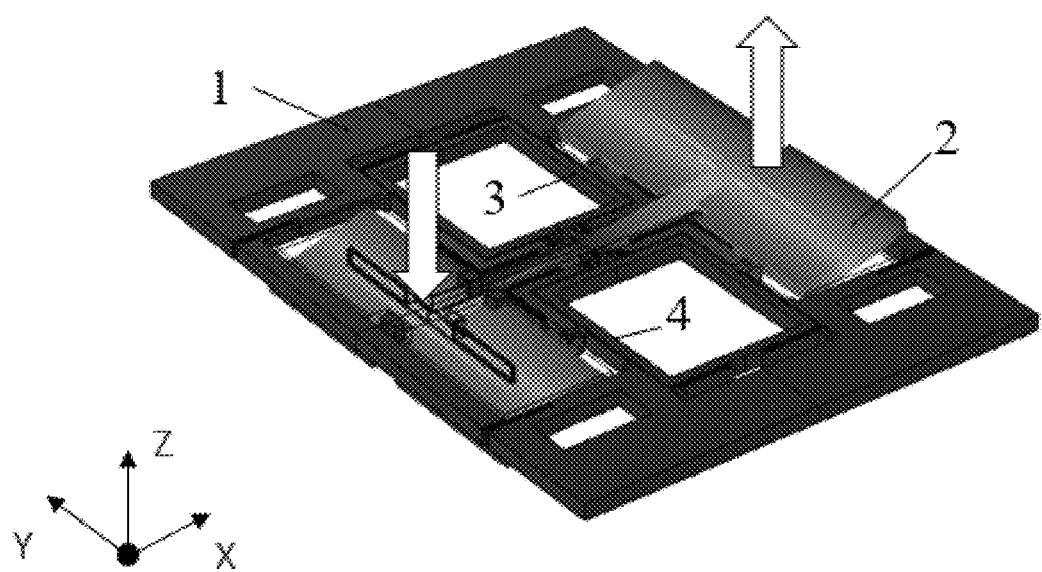
FIG. 6 is a structure diagram of the micro-mechanical gyroscope in the first detection mode according to some embodiments of the present disclosure.

When being applied a Y-axis angular velocity, the micro-mechanical gyroscope is put from the driving mode to the first detection mode. In this case, the second mass blocks 2 are subjected to Coriolis forces in the Z-axis direction (as shown by the white arrows in FIG. 6). Therefore, the second mass blocks 2 generate an out-of-plane vibration displacement along the Z-axis (i.e., vibration displacement towards the outside of the reference plane). By detecting the out-of-plane vibration displacement of the second mass blocks 2 along the Z-axis, the angular velocity around the Y-axis can be acquired by the micro-mechanical gyroscope.

Figure 7:
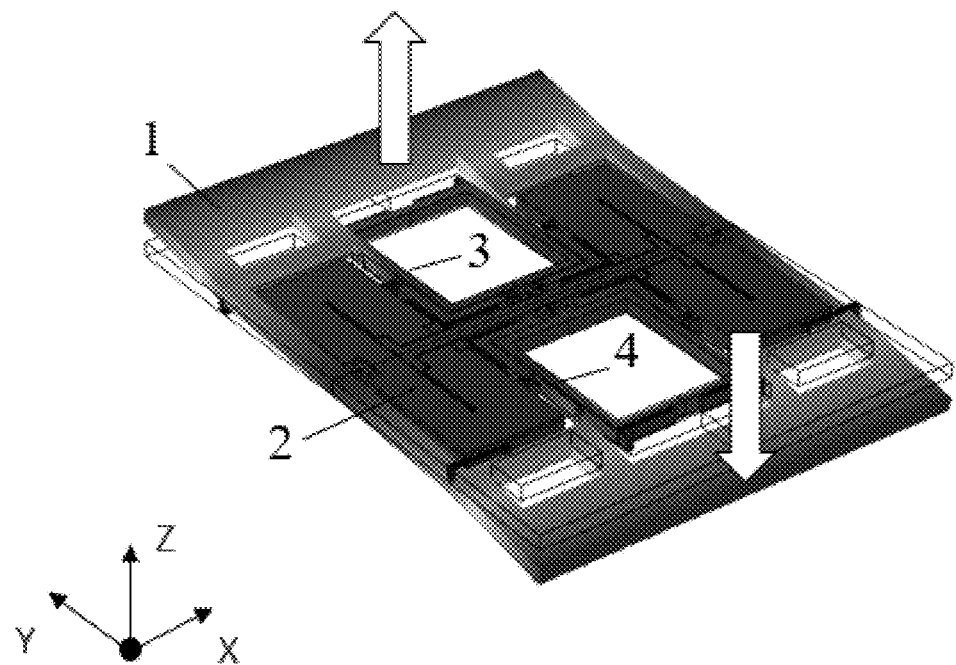
FIG. 7 is a structure diagram of the micro-mechanical gyroscope in the second detection mode according to some embodiments of the present disclosure.

When being applied an X-axis angular velocity, the micro-mechanical gyroscope is put from the driving mode to the second detection mode. In this case, the first mass blocks 1 are subjected to Coriolis forces in the Z-axis direction (as shown by the white arrows in FIG. 7). Therefore, the first mass blocks 1 generate an out-of-plane vibration displacement along the Z-axis (i.e., vibration displacement towards the outside of the reference plane). By detecting the out-of-plane vibration displacement of the first mass blocks 1 along the Z-axis, the angular velocity around the X-axis can be acquired by the micro-mechanical gyroscope.

Figure 8:
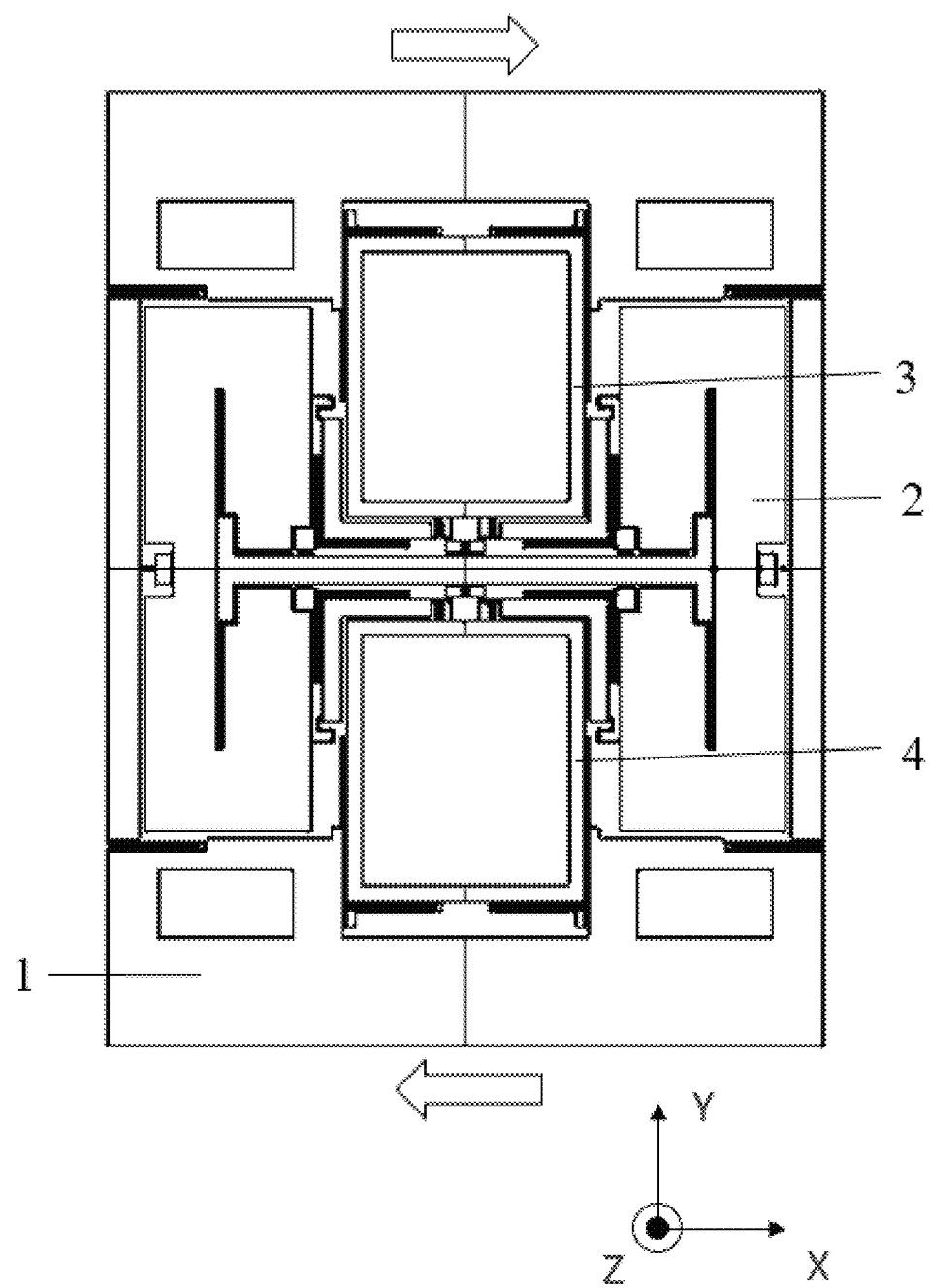
FIG. 8 is a structure diagram of the micro-mechanical gyroscope in the third detection mode according to some embodiments of the present disclosure.

When being applied a Z-axis angular velocity, the micro-mechanical gyroscope is put from the driving mode to the third detection mode. In this case, the first mass blocks 1 are subjected to Coriolis forces in the X-axis direction (as shown by the white arrows in FIG. 8). Therefore, the first mass blocks 1 generate an in-plane vibration displacement along the X-axis (i.e., vibration displacement in the reference plane). By detecting the in-plane vibration displacement of the first mass blocks 1 along the X-axis, the angular velocity around the Z-axis can be acquired by the micro-mechanical gyroscope.

In the micro-mechanical gyroscope provided by embodiments of the present disclosure, the plurality of first mass blocks 1 are arranged to face to each other in a first direction Y, and the plurality of second mass blocks 2, the first driving member 3 and the second driving member 4 are arranged between the plurality of first mass blocks 1. The first driving member 3 and the second driving member 4 are arranged to face to each other in the first direction Y, and in a second direction X, the plurality of second mass blocks 2 are arranged on either sides of the first driving member 3 and the second driving member 4. The first and second driving members are connected to a first mass block 1, respectively, through a flexible component. Ends of the plurality of second mass block 2 are connected to the first driving member 3 and the second driving member 4, respectively, through flexible components. When detecting angular velocity by the micro-mechanical gyroscope, the coupling between the driving mode and the detection modes of the plurality of first mass blocks 1 and the plurality of second mass blocks 2 can be reduced, thereby reducing the displacement of non-moving mass blocks. In this way, the degree of mutual interference of the plurality of first mass blocks 1 and the plurality of second mass blocks 2 in different modes can be reduced, and detection accuracy can be improved.

Moreover, the high proportion of shared mass between driving and detection effectively improves the conversion of Coriolis forces and enhances the sensitivity of the micro-mechanical gyroscope. This type of micro-mechanical gyroscope has a simple structure and is convenient for small-scale integration under limited process conditions, therefore has a reduced cost.

The driving mode of this type of micro-mechanical gyroscope uses differential driving, which can effectively improve the stability and impact resistance of driving of the micro-mechanical gyroscope.

Moreover, the three detection modes of the micro-mechanical gyroscope can achieve inverted vibration, which can effectively prevent the impact of acceleration shock and orthogonal errors.

In some embodiments, the plurality of first mass blocks 1 are symmetrically arranged along the first direction Y, the plurality of second mass blocks 2 are symmetrically arranged along the second direction X, and the first driving member 3 and the second driving member 4 are symmetrically arranged along the first direction Y. In this way, differential detection of the micro-mechanical gyroscope can be implemented.

Figure 3:
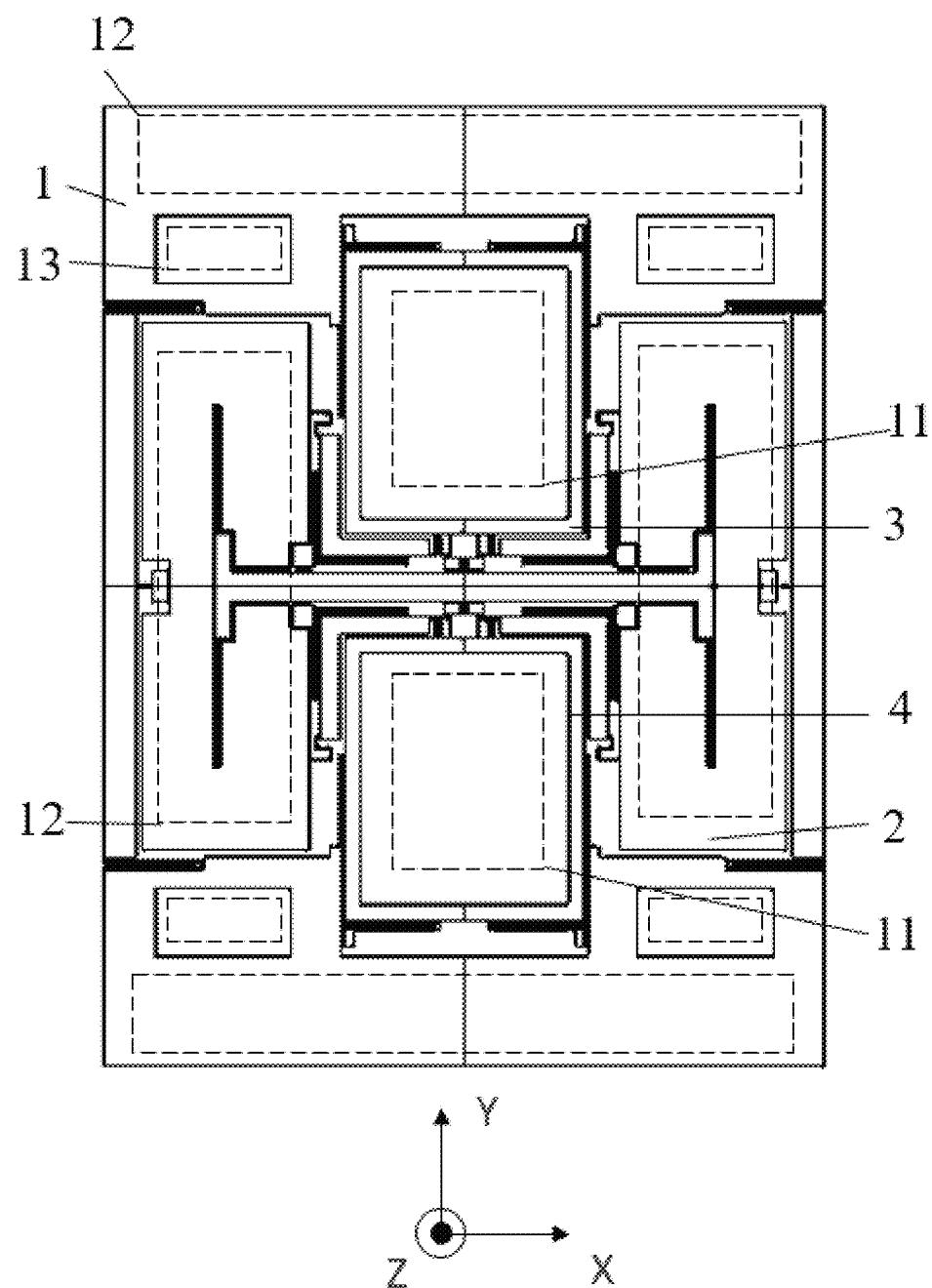
FIG. 3 is a schematic diagram of the micro-mechanical gyroscope incorporating in-plane driving transducers, out-of-plane detection transducers and in-plane detection transducers according to some embodiments of the present disclosure.
Figure 4:
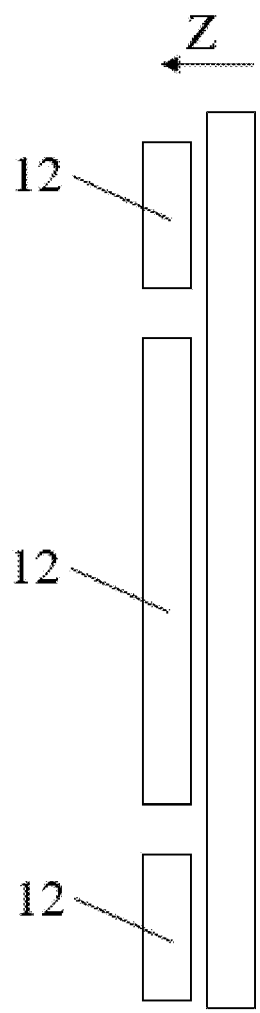
FIG. 4 is a side view of FIG. 3.

In some embodiments, as shown in FIGS. 3 and 4, the micro-mechanical gyroscope further includes in-plane driving transducers 11 (also referred to as in-plane driving electrodes), out-of-plane detection transducers 12 (also referred to as out-of-plane detection electrodes), and in-plane detection transducers 13 (also referred to as in-plane detection electrodes). Each of the first driving member 3 and the second driving member 4 has an accommodation space, and each in-plane driving transducer of the in-plane driving transducers 11 is arranged in a respective accommodation space. An out-of-plane detection transducer 12 and in-plane detection transducers 13 spaced from each other are arranged on a first mass block 1, and a respective out-of-plane detection transducer 12 is arranged on each second mass block of the plurality of second mass blocks 2.

When the micro-mechanical gyroscope is in the first detection mode, the second mass blocks 2 generate vibration displacement along the Z-axis due to the Coriolis forces. In this case, the out-of-plane detection transducer 12 arranged on the second mass block 2 detects the vibration displacement generated by the second mass block 2 along the Z-axis, thereby acquiring the angular velocity of the micro-mechanical gyroscope around the Y-axis.

When the micro-mechanical gyroscope is in the second detection mode, the first mass blocks 1 generate vibration displacement along the Z-axis due to the Coriolis forces. In this case, the out-of-plane detection transducer 12 arranged on the first mass blocks 1 detects the vibration displacement generated by the first mass blocks 1 along the Z-axis, thereby acquiring the angular velocity of the micro-mechanical gyroscope around the X-axis.

When the micro-mechanical gyroscope is in the third detection mode, the first mass blocks 1 generate vibration displacement along the X-axis due to the Coriolis forces. In this case, the in-plane detection transducer 13 arranged on the first mass blocks 1 detects the vibration displacement generated by the first mass blocks 1 along the X-axis, thereby acquiring the angular velocity of the micro-mechanical gyroscope around the Z-axis.

In some embodiments, the out-of-plane detection transducers 12 arranged on the plurality of first mass blocks 1 are symmetrically arranged along the first direction Y, the in-plane detection transducers 13 arranged on the plurality of first mass blocks 1 are symmetrically arranged along the first direction Y, and the out-of-plane detection transducers 12 arranged on the plurality of second mass blocks 2 are symmetrically arranged along the second direction X.

As shown in FIG. 3, an out-of-plane detection transducer 12 is arranged on each second mass block 2, and along the second direction X, the two out-of-plane detection transducers 12 on the two second mass blocks 2 are symmetrically arranged. There are an out-of-plane detection transducer 12 and two in-plane detection transducers 13 arranged on each first mass block 1. Along the first direction Y, the two out-of-plane detection transducers 12 on the two first mass blocks 1 are symmetrically arranged, and along the second direction X, the two in-plane detection transducers 13 on a same first mass block 1 are symmetrically arranged.

In this way, differential detection of the micro-mechanical gyroscope can be implemented.

In some embodiments, referring to FIG. 2, a first coupling component 5 includes first connecting beams. A first mass block 1 located on a side of the first driving member 3 away from the second driving member 4 is connected to the first driving member 3 through a first connecting beam, and a first mass block 1 located on a side of the second driving member 4 away from the first driving member 3 is connected to the second driving member 4 through a first connecting beam. A second coupling component 6 includes second connecting beams 61 and two first coupling parts 62. Each end of each first coupling part of the two first coupling parts 62 is connected with a respective second connecting beam 61, one first coupling part of the two first coupling parts 62 is connected to the first driving member 3 and one end of a second mass block 2, respectively, through the second connecting beams 61 located at both ends, and the other first coupling part 62 is connected to the second driving member 4 and the other end of the second mass block 2, respectively, through the second connecting beams 61 located at both ends.

The first connecting beams and the second connecting beams 61 are flexible beams, and the first coupling parts 62 are flexible parts. The first connecting beams, the second connecting beams 61, and the first coupling parts 62 are all used to provide in-plane oscillation degrees of freedom and out-of-plane movement degrees of freedom.

In some embodiments, as shown in FIG. 1, a second mass block 2 has a first end 21 and a second end 22 along the first direction Y. The first end 21 and the first driving member 3 are located on a same side of the second driving member 4, and the second end 22 and the second driving member 4 are located on a same side of the first driving member 3. The first end 21 is connected to the first driving member 3 through a second coupling component 6, and the second end 22 is connected to the second driving member 4 through another second coupling component 6.

For example, as shown in FIG. 1, the first driving member 3 is located above the second driving member 4, with the upper end of a second mass block 2 being the first end 21 and the lower end being the second end 22.

In some embodiments, referring to FIG. 1, the micro-mechanical gyroscope further includes a base 7, and third coupling components 8 and fourth coupling components 9 being flexible components. The base 7 has a square area 71, first anchor points 72 and second anchor points 73. A respective first anchor point 72 is arranged at each corner of the square area 71, and the first driving member 3 and the second driving member 4 are arranged on either sides of the square area 71 along the first direction Y. The plurality of second mass blocks 2 are arranged on either sides of the square area 71 along the second direction X, and the second anchor points 73 are arranged on a side of a second mass block 2 away from the square area 71. A second coupling component 6 is connected to a first anchor point 72 through a third coupling component 8, and each first mass block of the plurality of first mass blocks 1 arranged to face to each other in the first direction Y is connected to a second anchor point 73 through a respective fourth coupling component 9.

When the micro-mechanical gyroscope is in the first detection mode, the second mass blocks 2 are subjected to the Coriolis forces. Due to the connection of the second mass blocks 2 to the first anchor points 72, the second mass blocks 2 generate out-of-plane flip along the Z-axis.

When the micro-mechanical gyroscope is in the second detection mode, the first mass blocks 1 are subjected to the Coriolis forces. Due to the connection of the first mass blocks 1 to the second anchor points 73, the first mass blocks 1 generate out-of-plane flip along the Z-axis.

The third coupling components 8 and the fourth coupling components 9 are used to provide in-plane oscillation degrees of freedom and out-of-plane flip degrees of freedom.

In some embodiments, a third coupling component 8 includes a third connecting beam, and a second coupling component 6 is connected to a respective first anchor point 72 through the third connecting beam. A fourth coupling component 9 includes fourth connecting beams 91 and a second coupling part 92 connected to a respective second anchor point 73, and each end of the second coupling part 92 is connected to a respective first mass block 1 through a fourth connecting beam 91. The third connecting beam and the fourth connecting beams 91 are flexible beams, and the second coupling part 92 is a flexible part.

The micro-mechanical gyroscope further includes a fifth coupling component 10 being a flexible component. The base 7 further has a third anchor point 74 located between the first driving member 3 and the second driving member 4. The plurality of second mass blocks 2 arranged to face to each other in the second direction X are connected to each other through the fifth coupling component 10, and the fifth coupling component 10 is connected to the third anchor point 74. In this way, parasitic modes in detection can be effectively suppressed, thereby improving the detection accuracy of the micro-mechanical gyroscope.

In some embodiments, the fifth coupling component 10 includes a third coupling part 101 and fifth connecting beams 102. The third coupling part 101 is connected to the third anchor point 74, and each end of the third coupling part

101 is connected to a respective second mass block 2 through a respective fifth connecting beam 102. The fifth connecting beams 102 are flexible beams, and the third coupling part 101 is a flexible part.

Embodiments of the present disclosure further provide an electronic product including a main body and the micro-mechanical gyroscope as illustrated above, and the micro-mechanical gyroscope is installed in the main body.

In the working process of the electronic product, the micro-mechanical gyroscope can calculate the angular velocity of the electronic product, for easy control of the electronic product. The micro-mechanical gyroscope can reduce the degree of mutual interference of the plurality of first mass blocks 1 and the plurality of second mass blocks 2 in different modes and improve the detection accuracy, thereby improving the performance of the electronic product.

The above mentioned are only the embodiments of the present disclosure. It should be pointed out that for those skilled in the art, improvements may be made without departing from the inventive concept of the present disclosure, but these are all within the scope of protection of the present disclosure.

What is claimed is:

1. A micro-mechanical gyroscope, comprising:
  a plurality of first mass blocks and a plurality of second mass blocks, each second mass block having a rectangular shape;
  a first driving member and a second driving member; and
  first coupling components and second coupling components, and both first coupling components and second coupling components being flexible components;
  wherein the plurality of first mass blocks are arranged in a first direction (Y), and the plurality of second mass blocks, the first driving member and the second driving member are arranged between the plurality of first mass blocks;
  wherein the first driving member and the second driving member are arranged in the first direction (Y), the plurality of second mass blocks are arranged on either sides of the first driving member and the second driving member, the second mass blocks are arranged in a second direction (X), and the second direction (X) is perpendicular to the first direction (Y);
  wherein a first mass block arranged on a side of the first driving member away from the second driving member is connected to the first driving member through a first coupling component, and a first mass block arranged on a side of the second driving member away from the first driving member is connected to the second driving member through a first coupling component; and
  wherein ends of the plurality of second mass blocks in the first direction (Y) are connected to the first driving member and the second driving member, respectively, through the second coupling components;
  the first coupling component comprises first connecting beams, wherein the first driving member is connected to the first mass block through a first connecting beam, and the second driving member is connected to the first mass block through a first connecting beam; and
  the second coupling component comprises second connecting beams and two first coupling parts, wherein each end of each first coupling part of the two first coupling parts is connected with the respective second connecting beam, one first coupling part of the two first coupling parts is connected to the first driving member and one end of the second mass block, respectively, through the second connecting beams located at both ends of one first coupling part, and the other first coupling part is connected to the second driving member and the other end of the second mass block respectively, through the second connecting beams located at both ends of the other first coupling part.

2. The micro-mechanical gyroscope according to claim 1, wherein the plurality of first mass blocks are symmetrically arranged along the first direction (Y) with regard to a center of the micro-mechanical gyroscope, the plurality of second mass blocks are symmetrically arranged along the second direction (X) with regard to the center of the micro-mechanical gyroscope, and the first driving member and the second driving member are symmetrically arranged along the first direction (Y) regard to the center of the micro-mechanical gyroscope.

3. The micro-mechanical gyroscope according to claim 1, further comprising a base, and third coupling components and fourth coupling components being flexible components, and the base has a rectangular area, first anchor points and second anchor points;
  wherein a respective first anchor point is arranged at each corner of the rectangular area, the first driving member and the second driving member are arranged on either sides of the rectangular area along the first direction (Y), the plurality of second mass blocks are arranged on either sides of the rectangular area along the second direction (X), and the second anchor points are arranged on an outer side of a second mass block away from the rectangular area from a view along a Z-axis direction of the micro-mechanical gyroscope;
  wherein a second coupling component is connected to a first anchor point through a third coupling component, and each first mass block of the plurality of first mass blocks arranged to face to each other in the first direction (Y) is connected to the second anchor point through the respective fourth coupling component.

4. The micro-mechanical gyroscope according to claim 3, wherein a third coupling component comprises a third connecting beam, and the second coupling component is connected to a respective first anchor point through the third connecting beam; and
  wherein a fourth coupling component comprises fourth connecting beams and a second coupling part connected to a respective second anchor point, and each end of the second coupling part is connected to a respective first mass block through a fourth connecting beam.

5. The micro-mechanical gyroscope according to claim 4, further comprising a fifth coupling component being a flexible component, the base further has a third anchor point located between the first driving member and the second driving member, the plurality of second mass blocks are connected through the fifth coupling component, and the fifth coupling component is connected to the third anchor point.

6. The micro-mechanical gyroscope according to claim 5, wherein the fifth coupling component comprises a third coupling part and fifth connecting beams, the third coupling part is connected to the third anchor point, and each end of the third coupling part is connected to a respective second mass block through a respective fifth connecting beam.

7. The micro-mechanical gyroscope according to claim 1, further comprising in-plane driving transducers, out-of-plane detection transducers, and in-plane detection transducers;

wherein each of the first driving member and the second driving member has an accommodation space, and each in-plane driving transducer of the in-plane driving transducers is arranged in a corresponding accommodation space;

wherein an out-of-plane detection transducer and in-plane detection transducers spaced from each other are arranged on each first mass block, and a respective out-of-plane detection transducer is arranged on each second mass block of the plurality of second mass blocks.

8. The micro-mechanical gyroscope according to claim 7, wherein out-of-plane detection transducers arranged on the plurality of first mass blocks are symmetrically arranged along the first direction (Y) with regard to a center of the micro-mechanical gyroscope, each first mass block equipped with two in-plane detection transducers, the in-plane detection transducers arranged on the plurality of first mass blocks are symmetrically arranged along the first direction (Y) with regard to a connection position of two first mass blocks, and out-of-plane detection transducers arranged on the plurality of second mass blocks are symmetrically arranged along the second direction (X) with regard to the center of the micro-mechanical gyroscope.

9. An electronic product, comprising:
a main body; and
the micro-mechanical gyroscope according to claim 1;
wherein the micro-mechanical gyroscope is installed in the main body.

* * * * *